United States Patent [19]

Matsui et al.

[11] Patent Number: 4,931,881
[45] Date of Patent: Jun. 5, 1990

[54] METHOD OF REDUCING DIGITAL IMAGES

[75] Inventors: Nobuhiko Matsui; Kikuo Mita, both of Tokyo, Japan

[73] Assignee: Eastman Kodak Company, Rochester, N.Y.

[21] Appl. No.: 346,034

[22] Filed: May 1, 1989

[30] Foreign Application Priority Data

Jan. 25, 1989 [JP] Japan .................................. 1-016014

[51] Int. Cl.⁵ .............................................. H04N 1/40
[52] U.S. Cl. ..................................... 358/466; 358/454
[58] Field of Search ................................ 358/464, 466

[56] References Cited

U.S. PATENT DOCUMENTS

| | | | |
|---|---|---|---|
| 4,554,593 | 11/1985 | Fox | 358/466 |
| 4,570,186 | 2/1986 | Kurata | 358/464 |
| 4,656,665 | 4/1987 | Pennebaker | 358/466 |
| 4,710,822 | 12/1987 | Matsunawa | 358/466 |
| 4,742,399 | 5/1988 | Kitamura | 358/466 |
| 4,751,585 | 6/1988 | Shibazaki | 358/464 |

*Primary Examiner*—Howard W. Britton
*Attorney, Agent, or Firm*—Raymond L. Owens

[57] ABSTRACT

An image binarization system in which the threshold value used for the binarization process can be adjusted to thereby enable the process to be made more accurate and avoid loss of black areas in characters in the process of digitizing and conversion. The threshold value is based on the average value of pixel density values around the pixels to be binarized, and is corrected downward when the average density value of the surrounding pixels is larger than a specific boundary value, and upward when the average value is smaller than the said boundary value.

4 Claims, 6 Drawing Sheets

METHOD OF REDUCING DIGITAL IMAGES

BACKGROUND OF THE INVENTION

1. Field of the Invention

The present invention relates to a reducing digital image having multiple tone density values into a binary image.

2. Description of the Prior Art

The term "binarizing" means to reduce a multi-value digital signal into a two-value binary signal. When documents are transmitted using means such as a facsimile device, an image is processed by using optical means and the image is converted into a digital image having a density value for each of the multiplicity of pixels (i.e., piture elements). These digital pixels are then reduced into binary digital signals, using a threshold value.

However, because the threshold value is a fixed value, when such devices are used for non-stop scanning of documents in which there is a variance in the desity values caused by differences in the colors of the paper and the density of the characters, there has been a problem of loss of information caused by an inability to binarize accurately all the image information in the documents.

Methods that have been employed to solve this problem include use of a floating, instead of a fixed, threshold value for the binarization, with the floating threshold value being obtained based on the average value of the pixel density values around the pixel that is to be binarized.

FIG. 11 illustrates an example of a threshold value setting method according to the prior art. In FIG. 11, the horizontal axis is the quantized average value of the pixel density values around the pixel that is to be binarized using an 8-bit binary number (0-255), and the vertical axis is the threshold value, also represents as an 8-bit binary number. As shown in FIG. 11, the threshold value is a function that changes in accordance with the average pixel density value, even when processing on a continuous basis a multiplicity of documents in which there is a variance in density values, binarization can be carried out in accordance with the density value of each document.

However, one of the problems with the conventional method described above is that only parts at which there is a large difference between the density value of the pixels to be binarized and the density value of the surrounding pixels are binarized correctly, that is, the borderline portions of the alphanumeric and graphic characters, while at parts where the density value of the pixels to be binarized is of the same order as the density value of the surrounding pixels, pixels having a density value that correctly should be converted as black has been incorrectly converted as white, producing characters and patterns with voids and pronounced borders.

This will now be considered with respect to the binarization of a sample image of a check, with reference to FIG. 12 (a) which shows the part where the amount has been entered. The amount section and the surrounding paper of the check both have around the same low density value (i.e., black). When the threshold value setting method illustrated by FIG. 11 was used, because the threshold value at this part was so low the low-density-value amount section was converted into white instead of into the original black. The inability to binarize the image correctly produced the result shown in FIG. 12 (b), a binarized image in which it is difficult to distinguish the amount portion.

Another example of the type of problem caused by the inability to binarize accurately is shown in FIG. 13 (a). In this case, in the process of binarization symbols relating to weather conditions, specifically the filled bullet a representing rain and the semi-filled bullet b representing thunderstorms, have been transformed into the wrong symbols owing to the loss of the black filling.

SUMMARY OF THE INVENTION

In the view of the problems with conventional image binarization systems as described above, the object of the present invention is to provide an improved method for image binarizing digital images in which the threshold value used in the binarization can be corrected, making it more adaptive compared with conventional systems and thereby enabling images to be processed accurately without voids being produced in the characters and patterns concerned and the consequent loss of information.

To attain the above object, a method of reducing a digital image having digital pixels with discrete values corresponding to multiple density values into a binary image having binary pixels with values corresponding to black and white, respectively, comprising the steps of:

a. calculating the average value of density values of the digital pixels around each given digital pixel to be reduced;

b. comparing such average pixel value with a selected boundary value;

c. selecting a threshold value in accordance with an algorithm which is based upon whether the average value is different than the boundary value; and d. comparing the selected threshold value with the given digital pixel value and producing a binary signal.

image binarization according to the present invention also can use a boundary value that is not a specified value, but is instead variable and can be changed within a prescribed range based on the average density value of the multi-density value, digital pixels surrounding the pixel to be binarized, wherein information relating to image density values is binarized using a threshold value that is corrected by adjusting it downward compared to the original threshold value when the average value of the desity values of the pixels surrounding a pixel to be binarized is larger than the variable boundary value, and using a threshold value that is corrected by adjusting it upward compared to the original threshold value when the average value of the density values of the pixels surrounding the pixel to be binarized is smaller than the variable boundary value.

By thus correcting the threshold value at the boundary value by adjusting it upward or downward and comparing the threshold value and the density value of the pixels to be binarized and performing the binarization on the basis of the relationship between the sizes of the values, it is possible to perform accurate binarization processing.

Thus, with reference to FIG. 1, when the average density value of the pixels surrounding the pixel to be binarized is higher than a specific boundary value, the threshold value is corrected by adjusting it downward, compared with the original threshold value. When the original threshold value pixels have a density value that should be reduced to white, the prior art binarization process would have wrongly reduced to black because the threshold value was too large. Correct binarization is achieved in accordance with present invention by correcting the threshold value downwards, and pixels having a density value that should be converted to white by the process in fact converted to white.

Conversely, when the average density value of the pixels surrounding the pixels to be binarized is lower than the specific boundary value the threshold value is corrected by adjusting it upward, compared with the original threshold value. As a result, when the original threshold value pixels having a density value that should be reduced to black by the prior art binarization process would have been wrongly converted to white because the threshold value was too small. Correct binarization is achieved in accordance with the present invention by correcting the threshold value upwards, pixels having a density value that should be converted to black by the process are in fact converted to black.

In addition, by having the boundary value shown in FIG. 1 variable rather than fixed so that it can be changed within a prescribed range based on the density value of the original pixels surrounding the pixel to be binarized, even when a series of documents is to be binarized in which there are differences in the density values of the alphanumeric and graphic characters, the value boundary value can be changed for each document and the threshold value thus appropriately correctd, enabling the binarizaton to proceed correctly.

Further features of the invention, its nature and various advantages will be more apparent form the accompanying drawings and the following detailed description of the invention.

DETAILED DESCRIPTION OF THE INVENTION

Figure 2:
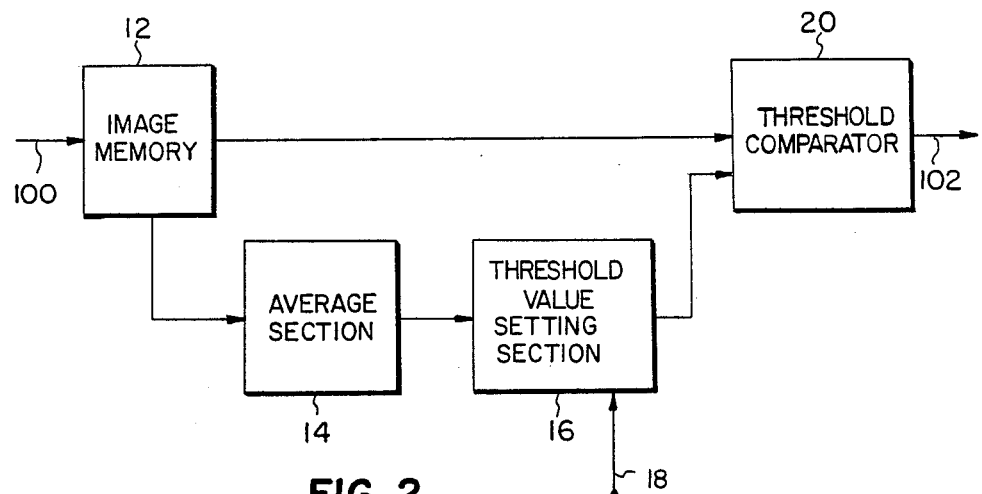
FIG. 2 is a schematic drawing of the configuration of a first embodiment for practicing a method according to the present invention.

FIG. 2 is a schematic drawing showing the configuration of a first embodiment for practicing method of the present invention. In the processing of document images consisting of alphanumeric and graphic characters, a single image is treated as a multiplicity of picture elements. An optical means (not shown) is used to convert the density values of the pixels into electrical signals of varying strengths.

Figure 1:
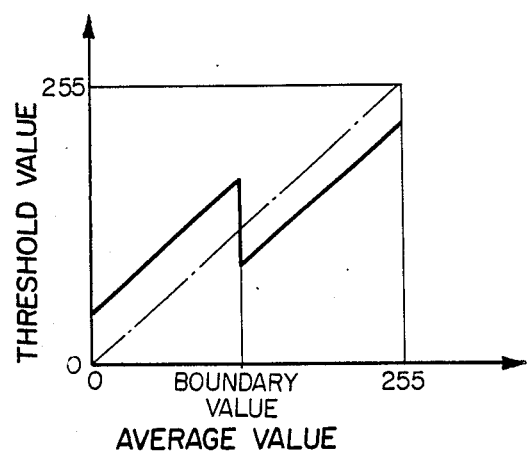
FIG. 1 is a function drawing illustrating an example of the threshold value setting used an image binarization method according to the present invention.

Information relating to the density values of analog images converted into digital electrical signals is input into an image memory 12 as a digital image signal 100, where it is stored as an 8-bit quantized number, for example. Among the information stored in the image memory 12 relating to the density values of each of the digital pixels that form the image, information relating to the density value of the pixels around a pixel to be binarized is sent to an averaging section 14 which calculates the average value of the said density values. The average density value of the digital pixels around the pixel to be binarized, which is calculated by the averaging section 14, is sent to a threshold value setting section 16 which sets the threshold value to be used during binarization. The density value of the pixel to be binarized and the said threshold value are sent to a threshold comparator 20 where they are compared. In accordance with the size relationship between the two values, the pixel will be binarized to a digital value corresponding either to white or to black. The binarized pixel density value is output as an output signal 102, processing the document in terms of binary images of black and white. The term "black" as used herein refers to a dark colored pixel and the term "white" refers to a lightly colored pixel. Here, the characterizing feature of the present invention is that during the setting of the threshold value by the threshold value setting section 16, a new, specific boundary value 18 is input into the threshold value setting section 16 and, as illustrated by FIG. 1, when the average value of the density values of the digital pixels surrounding a pixel to be binarized is larger than the specific boundary value, the threshold value used is corrected by a downward adjustment below the [original] threshold value, and when the average value of the density values of the pixels surrounding the pixel to be binarized is smaller than the specific boundary value, the threshold value used is corrected by an upward adjustment above the [original] threshold value.

Figure 3:
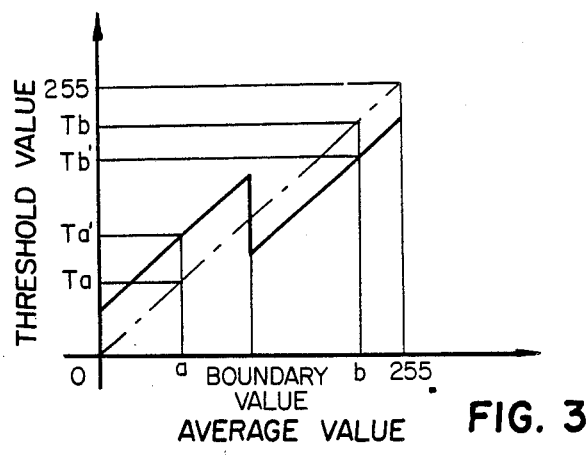
FIG. 3 is an explanatory drawing of the threshold value correction in the first embodiment.
Figure 4A:
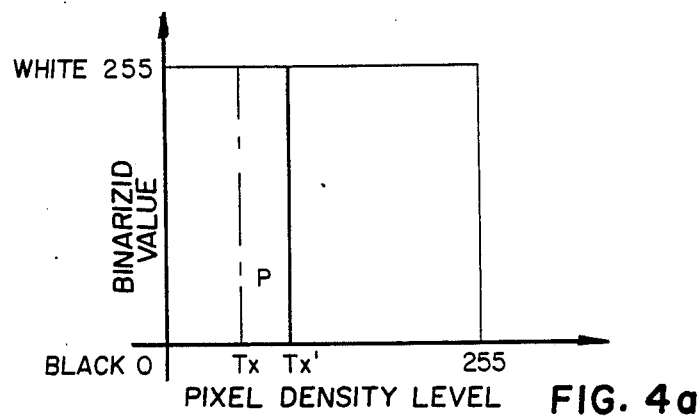
FIGS. 4a-4b are explanatory drawings illustrating the binarization of the first embodiment.
Figure 4B:
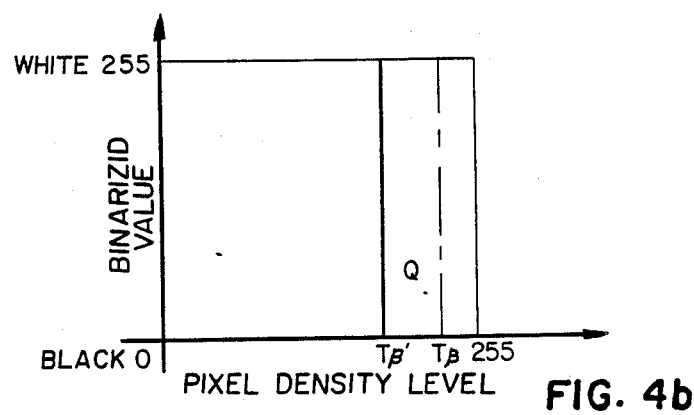

By adaptively correcting the threshold value in accordance with the density value of the surrounding pixels, with reference to FIG. 3, for example, when the surrounding pixels have a low average density value, an average value indicated in the drawing by a for example, the original threshold value Ta is corrected by raising it to Ta' (Ta\Ta'). because of this, when the density value of the pixel to be binarized is compared with the threshold value by the threshold comparator 20 shown in FIG. 2, as illustrated by FIG. 4 (a), a pixel having a density value indicated by P that previously would have suffered internal voiding through being incorrectly converted to white (in the drawing, corresponding to a value 255) owing to the compared threshold value being larger than the threshold value Ta can, by using the corrected threshold value Ta', be correctly converted to black (corresponding to a value 0 in the drawing) and voiding thereby prevented.

In the same way, again with reference to FIG. 3, when the surrounding digital pixels have a high average density value, for example, an average value indicated in the drawing by b, the original threshold value Tb is corrected by lowering it to Tb' (Tb>Tb'). Because of this, when the density value of the pixel to be binarized is compared with the threshold value by the threshold comparator 20 shown in FIG. 2. as illustrated by FIG. 4 (*b*), a pixel having a density value indicated by Q that previously would have been incorrectly converted to black (in the drawing, corresponding to a value 0) owing to the compared threshold value being smaller than the threshold value Tb can, by using the corrected threshold value Tb', be correctly converted to white (corresponding to a value 255 in the drawing).

Figure 5A:
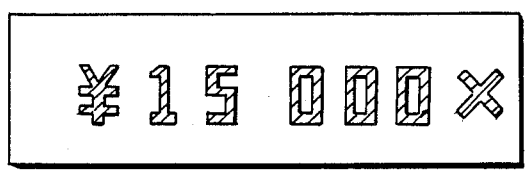
FIGS. 5a and 5b are drawings of a specimen image produced in accordance with the first embodiment of the invention.
Figure 5B:
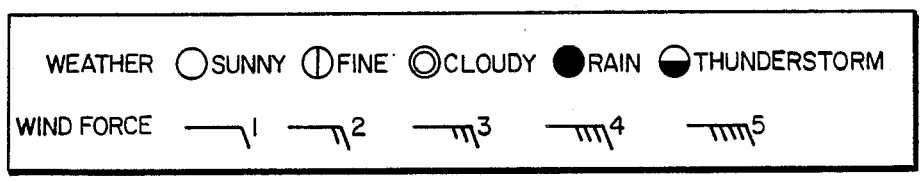
Figure 13A:
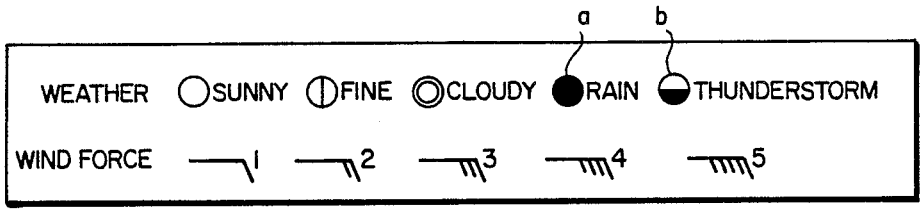
FIGS. 13a-13b show drawings of another specimen image and the binarized image thereof produced using the conventional method.
Figure 13B:
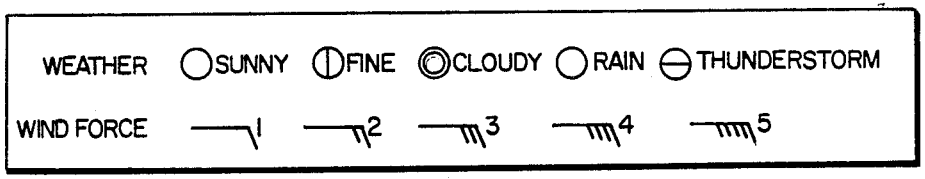
Figure 12A:
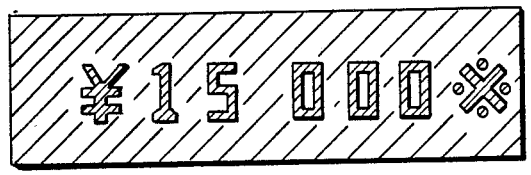
FIGS. 12a-12b show drawings of a specimen image and of the binarized image thereof produced using a conventional method.
Figure 12B:
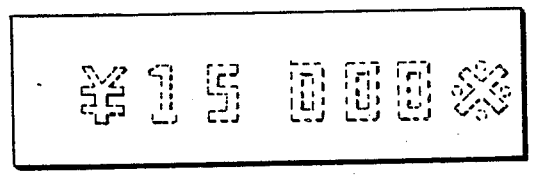

FIG. 5 shows examples of binarized images produced according to a method of the present invention and crresponding to the images shown in FIGS. 12 and 13 produced by a conventional method. The accuracy of the binarization according to the ayatem of the present invention is readily apparent, compared to the conventional system.

Figure 6:
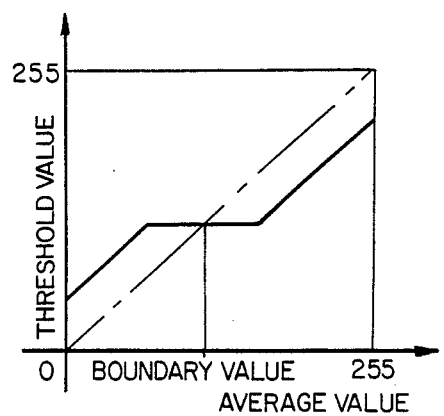
FIGS. 6 and 7 are drawings showing other threshold value setting functions used in the image binarization system of the present invention.
Figure 7:
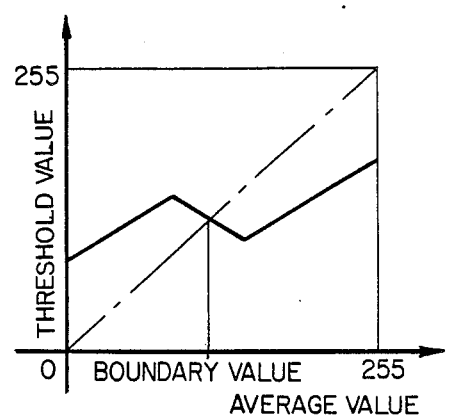

In this embodiment, the threshold value has been corrected as shown in FIG. 1, but it is to be understood that a correction as illustrated in FIG. 6 or FIG. 7 also may be used.

Figure 8:
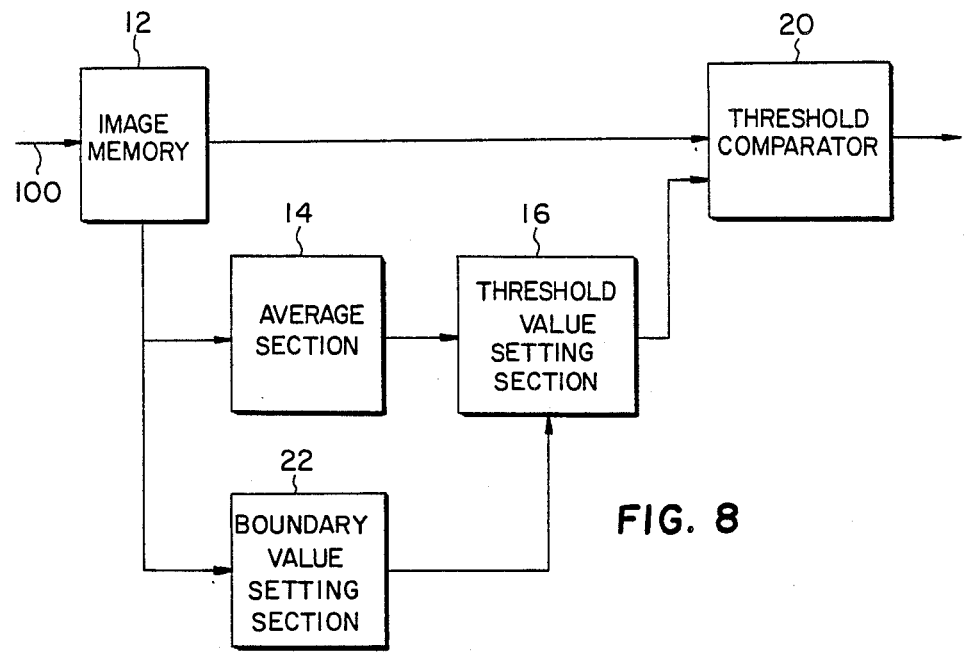
FIG. 8 is a schematic drawing of the configuration of a second embodiment for practicing a method according to the present invention.

FIG. 8 shows the configuration of a second embodiment which can practice a method according to the present invention. In FIG. 8, parts that are the same as parts shown in FIG. 2 have been given the same reference numerals; further description of these parts here is omitted.

In this embodiment, instead of inputting a specific boundary value into the threshold value setting section 16 as shown in the configuration illustrated by FIG. 2, a boundary value setting section 22 is provided whereby the boundary value is changed on the basis of a certain, specific range of multi-value digital pixel density values around the pixel to be binarized, an is then input into the threshold value setting section 16. Possible schemes for the changing calculating an intermediate point, maximum frequency, or the mean of the maximum and minimum values of a specified range of pixel density values. In this embodiment the mean of the maximum and minimum values in a specified range of pixel density is determined by the boundary value setting section 22.

Figure 9A:
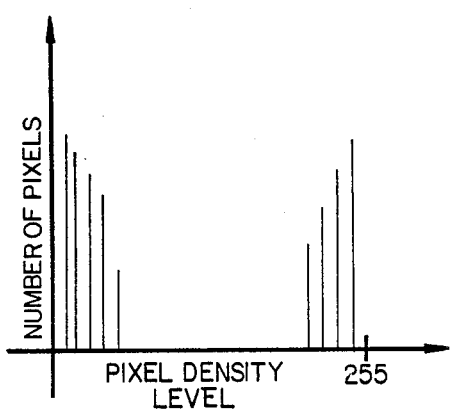
FIGS. 9a-9b are histograms showing the variance in density between documents.
Figure 9B:
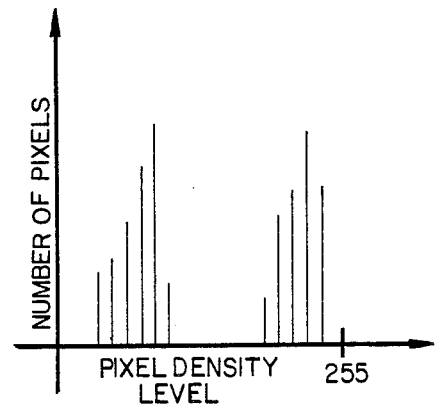
Figure 10A:
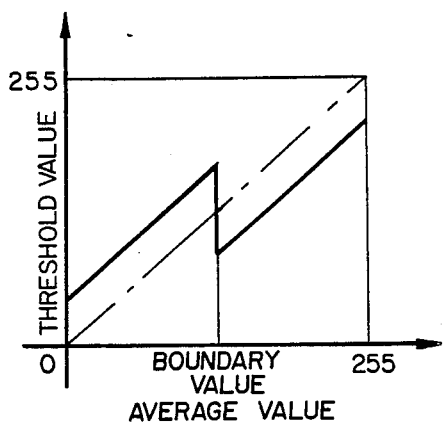
FIGS. 10a-10b are explanatory drawings of the bounary value adjustment in the second embodiment of the invention.
Figure 10B:
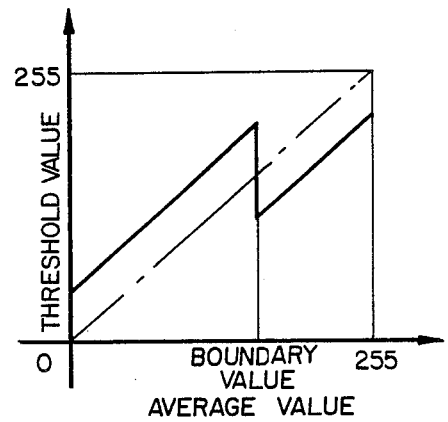
Figure 11:
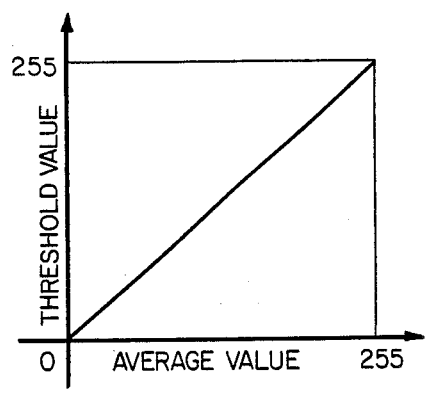
FIG. 11 is a function drawing illustrating threshold value setting as used in a conventional system.

In the embodiment thus configured, the boundary value can be changed on the basis of a certain, specific range of pixel density values around the pixel to be binarized. Therefore, when histograms are prepared in which the horizontal axis is the pixel density value and the vertical axis is the number of pixels, as shown in FIG. 9, even in the case of consecutive binarization of two document images having differing pixel number distributions caused by differences in character densities and in the color of the paper, because, as shown in FIG. 10, the boundary values shift in accordance with the density value, the threshold value can be corrected appropriately for each document.

With an image binarization method according to the present invention, the threshold value used during the binarization of document images can be appropriately corrected, thereby enabling the binarization to be effected accurately with no loss of information caused by voids in the alphanumeric and graphic characters.

The invention has been described in detail with particular reference to a preferred embodiment thereof, but it will be understood that variations and modifications can be effected within the spirit and scope of the invention.

What is claimed is:

1. A method of reducing a digital image having digital pixels with discrete values corresponding to multiple density values into a binary image having binary pixels with values corresponding to black and white, respectively, comprising the steps of:
   a. calculating the average value of density values of the digital pixels around each given digital pixel to be reduced;
   b. comparing such average pixel value with a selected boundary value;
   c. selecting a threshold value in accordance with an algorithm which is based upon whether the average value is different than the boundary value; and
   d. comparing the selected threshold value with the given digital pixel value and producing a binary signal.

2. The method of claim 1 including the step of changing the selected boundary value on the basis of the range of digital pixels around the given digital pixel.

3. A method of reducing a digital image having digital pixels with discrete values corresponding to multiple density values into a binary image having binary pixels with values corresponding to black and white, respectively, comprising the steps of:
   a. calculating the average value of density values of the digital pixels around each given digital pixel to be reduced;
   b. comparing such average pixel value with a selected boundary value;
   c. selecting (i) a threshold value equal to the average value when the average value is equal to the selected boundary value and greater than the average value when the average value is less than the selected boundary value and less than the average value when the average value is greater than the boundary value; and
   d. comparing the selected threshold value with the given digital pixel value and producing a binary signal.

4. The method of claim 3 including the step of changing the selected boundary value on the basis of the range of digital pixels around the given digital pixel.

* * * * *